(No Model.)

H. WILLIAMSON.
SAW SWAGING DEVICE.

No. 476,850. Patented June 14, 1892.

WITNESSES:
George A. McLandress
N. B. Ferris

INVENTOR
Henry Williamson
BY
A. H. Swarthout
his ATTORNEY

UNITED STATES PATENT OFFICE.

HENRY WILLIAMSON, OF BAY CITY, MICHIGAN.

SAW-SWAGING DEVICE.

SPECIFICATION forming part of Letters Patent No. 476,850, dated June 14, 1892.

Application filed December 9, 1891. Serial No. 414,521. (No model.)

*To all whom it may concern:*

Be it known that I, HENRY WILLIAMSON, a citizen of the United States, residing at Bay City, in the county of Bay and State of Michigan, have invented certain new and useful Improvements in Saw-Swaging Devices; and I do declare the following to be a full, clear, and exact description of the invention, such as will enable others skilled in the art to which it appertains to make and use the same, reference being had to the accompanying drawings, and to letters of reference marked thereon, which form a part of this specification.

My invention is a saw-swager for any kind of a saw—circular, gang, or band—and is an improvement on my swage patented September 1, 1885, No. 325,467; and it consists, essentially, of the die and its co-operative parts and in the combination of the same.

Figure 1:
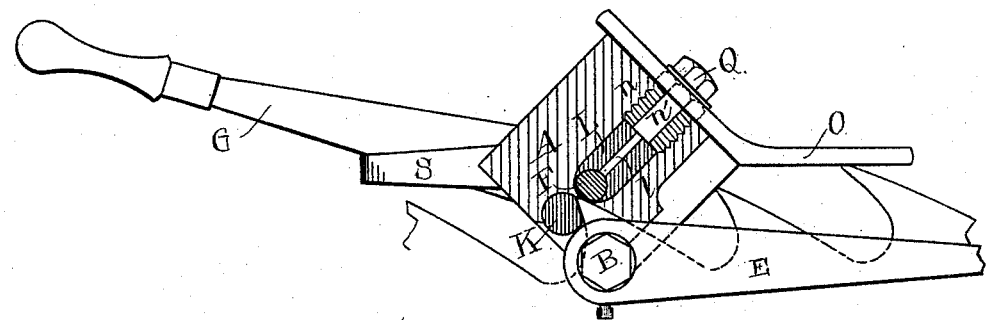
Figure 2:
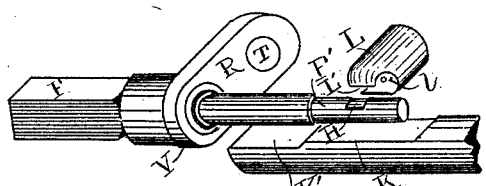
Figure 3:
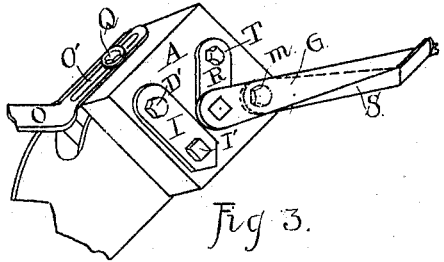
Figure 4:
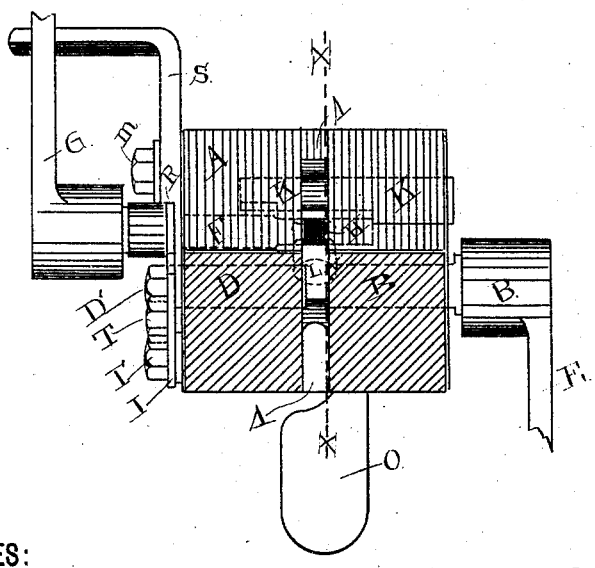

Figure 1 is a side part sectional view on line X X of Fig. 4. Fig. 2 is a view of the die and its co-operative parts. Fig. 3 is a side perspective, and Fig. 4 is a front view.

A is a piece of metal, cube or nearly cube shaped, provided with necessary holes for securing the parts hereinafter described, and a slot $l$ across and about the middle of one side and extending about half-way across the adjoining side, forming a slot into which the saw-tooth is placed for swaging. A screw-threaded spindle D is inserted through the cube into one side of this slot, and, by means of the clip I and screw-heads I' and D', is held into place and subject to adjustment by loosening the clip and turning spindle D in or out, as desired.

Opposite spindle D and designed to clamp with it on the opposite side of the saw is another screw-threaded spindle B, provided with a crank-handle E. Placing the tooth within the slot $l$ and turning the handle E clamps the tooth against D while it is being swaged.

Back of the spindles B and D a shaft F is journaled parallel with them and provided with a crank-handle G. The hole into which this shaft F is placed is drilled the same diameter throughout, while the shaft F, it will be observed, is not of the same diameter throughout, the inner end being much smaller than the hole and without any support, except as hereinafter described. The clip R is held upon the shaft by a split washer fitting into an annular groove upon the shaft F and countersunk into the clip. The clip R, with its nut T, keeps the shaft from moving longitudinally.

On the shaft F a die H is formed by cutting a segmental groove in the shaft, the bottom of the groove being made convex transversely. The die H is formed directly at the point where the shaft crosses the groove $l$ of the cube.

Just below the shaft F is a spindle K, held in place by a set screw $u$. Upon the spindle K a flat surface K' is formed. This flat surface K' is just above the die H and so near to it that only the point of a saw-tooth can pass between them. The depth of the point may be regulated somewhat by turning the spindle K so that less or more of the flat surface of K' be presented to the opening; but this adjustment is especially designed to adapt the swage to the hook of the tooth. This part K' is often called the "anvil," since it answers its purpose in swaging by the old method.

L is a spindle entering the cube at right angles to the shaft F and directly opposite the slot $l$ and held in place by the screw-head $n$, which has a groove $n'$ running through and connecting with the groove $l$ in the spindle L.

Across the end of L, parallel with the shaft F, is a circular groove into which the inner end of the shaft F is inserted and which forms the bearing or support of the small end of the shaft F, as hereinbefore mentioned. The inner edges of the spindle L are beveled off, as shown in Fig. 2, so as not to interfere with the teeth entering the die, the bearing L of the shaft F being directly back of the die H. By this arrangement the distance between the anvil K' and the die H can be regulated by the screw-head $n$.

The orifices $n'$ and $l$ are for the purpose of oiling the die. The end of the orifice $n'$ can be corked up after oiling.

O is a guide extending along the top of the tooth, and regulates to some extent the depth of the swage, as well as making it uniform. By means of the slot O' and the screw Q the guide may be adjusted as desired.

S is an arm secured to the side of the cube near the crank-handle G of the die-shaft F by the set-screw $m$. Its object is to regulate the die H. This is best illustrated in Fig. 1.

The handle G rests upon S when the die is ready for use, and as the handle is raised up the enlarging convexity of the die will be turned upon the tooth, flattening or swaging it. It is obvious if S is raised up less space will be found for the tooth between the die and the anvil, and consequently less of the tooth will be swaged.

It will be observed that by my device the swaging is upon the top of the tooth instead of the bottom, as is more common. This is of great advantage, causing less filing to sharpen the saw.

I do not wish to confine myself to the particular mechanical construction shown, and therefore any change may be made as comes within ordinary mechanical skill without departing from the principle of my invention.

Having thus described my invention, what I claim as new, and desire to secure by Letters Patent, is—

1. In a saw-swage, the adjustable bearing L within the swage for the die-shaft, substantially as shown.

2. A saw-swage consisting of the shaft F, provided with a segmental groove forming a die, an adjustable die-shaft bearing within the swage, a spindle having a flat surface forming an anvil, and a gripping device, substantially as described.

3. In a saw-swage, the combination, with the shaft F, provided with a segmental groove forming a die, of an adjustable bearing for the die-shaft within the swage and a spindle having a flat surface forming an anvil, arranged and operated substantially as described.

4. In a saw-swage, the combination, with a box or cube A, of a shaft on which a die is formed, an adjustable bearing for the shaft within the swage, an adjustable spindle on which an anvil is formed, a handle secured to the die-shaft, the setting device S for adjusting the die, and a tooth-gripping device, substantially as described.

5. In a saw-swage, the combination, with the box or cube A, of the shaft F, on which the die H is formed, the adjustable bearing L for the die-shaft within the swage, the adjustable spindle K, on which the anvil K' is formed, the handle G on the die-shaft, the setting device S, the clip R, secured on the outer end of the die-shaft by the split washer V, fitting into an annular groove in the shaft and countersunk in the clip, the adjustable guide O, and the tooth-gripping device, substantially as described.

In testimony whereof I affix my signature in presence of two witnesses.

HENRY WILLIAMSON.

Witnesses:
 A. H. SWARTHOUT,
 GEORGE A. MCLANDRESS.